Figure 1:
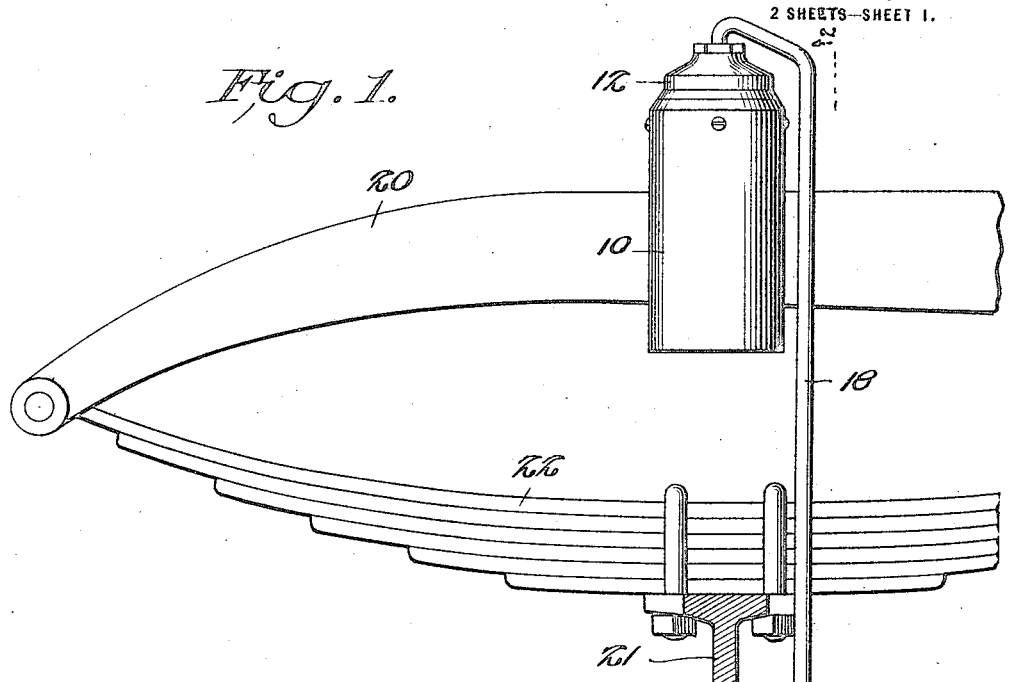

C. E. ARNESON.
SHOCK ABSORBER.
APPLICATION FILED JAN. 25, 1922.

1,434,243.

Patented Oct. 31, 1922.
2 SHEETS—SHEET 1.

Inventor
C. E. Arneson,
by Breght & Bailey
Attorney

C. E. ARNESON.
SHOCK ABSORBER.
APPLICATION FILED JAN. 25, 1922.

1,434,243.

Patented Oct. 31, 1922.
2 SHEETS—SHEET 2.

Inventor
C. E. Arneson,
by Bright & Bailey
Attorneys

Patented Oct. 31, 1922.

1,434,243

UNITED STATES PATENT OFFICE.

CHARLES E. ARNESON, OF SIOUX FALLS, SOUTH DAKOTA.

SHOCK ABSORBER.

Application filed January 25, 1922. Serial No. 531,631.

*To all whom it may concern:*

Be it known that I, CHARLES E. ARNESON, a citizen of the United States, and resident of Sioux Falls, in the county of Minnehaha and State of South Dakota, have invented certain new and useful Improvements in Shock Absorbers, of which the following is a specification.

As is well known, the riding qualities of a vehicle are most comfortable and steady when the body supporting springs thereof are subjected to their normal load, the reason being that the load prevents excessive compression and rebound movements of the springs and thereby decreases vibrations. It is therefore my purpose to provide a device for placing an artificial massless load upon the springs of a vehicle to obtain the same easy riding qualities thereof for any load, light or heavy, within the maximum capacity of the springs, and in addition, to provide a device of this character which is capable of checking rebound of the springs to relieve the body of shocks and vibrations set up by the wheels and springs during travel of the vehicle over uneven surfaces.

More particularly the device of my invention consists of plural telescoping cylinders one of which is adapted to be attached to the frame and another to the spring or spring carried part of the running gear of a vehicle and adapted to contain between them a compressed body of air or other compressible fluid acting to impose on the spring a massless artificial load, said cylinders being relatively movable to permit deflections of the spring under normal conditions and being so arranged that the air cushion between them acts to check rebound of the spring following its excessive compression.

The device of my invention possesses the added beneficial characteristics of minimizing side sway of vehicles, reducing wear on all parts, preventing the rear or drive wheels from spinning and to a considerable extent eliminating their tendency to skid.

My inventive idea is capable of embodiment in various mechanical structures, one of which is illustrated in the accompanying drawings, but it is to be understood that the structure shown is merely intended as a disclosure of my invention in a preferred form and that its scope is as defined in the appended claims.

Figure 2:
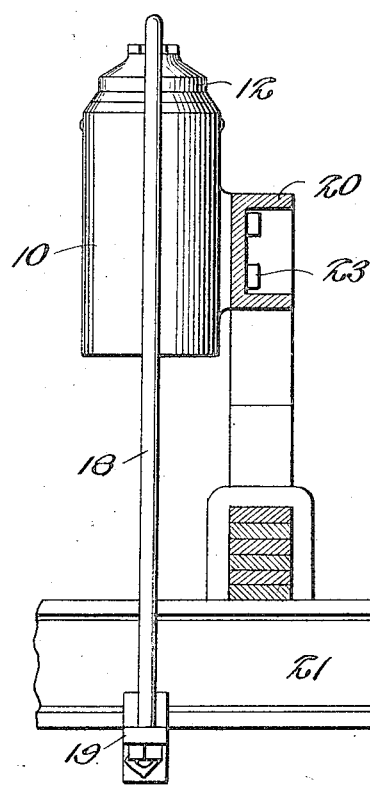

In the drawings, wherein like characters of reference denote corresponding parts in the different views:

Fig. 1 is a side elevation of my device operatively associated with the frame and a spring of a vehicle;

Fig. 2, a section on the line 2—2 of Fig. 1; and

Figure 3:
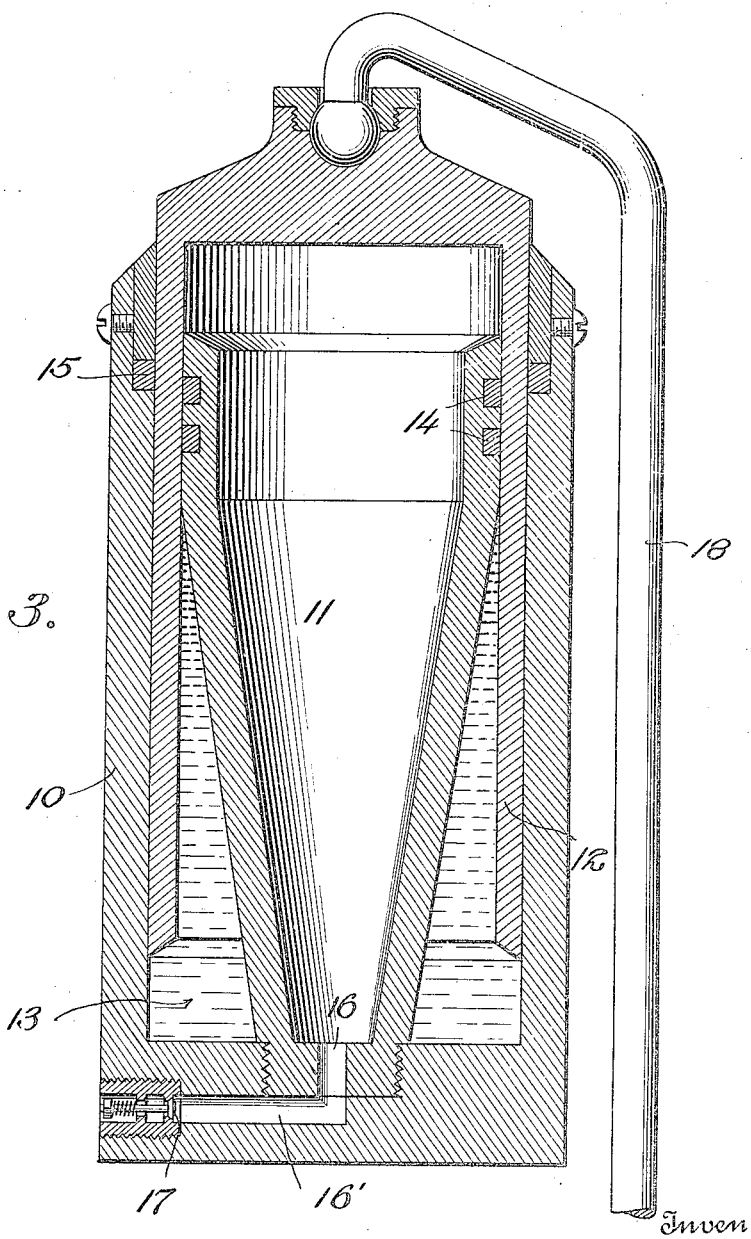

Fig. 3, a vertical section through the device.

Referring to the drawings in detail, particularly to Fig. 3, it will be observed that the device of my invention consists essentially of an outer cylinder 10 closed at its bottom and open at its top, an inner cylinder 11 also open at its top and closed at its bottom with respect to the interior of the outer cylinder, and an intermediate cylinder 12 between said outer and inner cylinders closed at its top and open at its bottom.

The inner cylinder 11 is tapered from an intermediate point towards its lower end or otherwise formed to provide a pocket or space 13 between it and the other cylinders at the lower end of the device, and is rigidly fixed with respect to the outer cylinder in any preferred manner as for instance, as shown, by having its lower end threaded into a recess in the bottom of said outer cylinder. The inner and outer cylinders are disposed in concentric relatively spaced relation and the intermediate cylinder is vertically slidable between them, rings 14 and packing 15 being carried by the inner and outer cylinders, respectively, and bearing against the inner and outer surfaces of the intermediate cylinder to provide a seal between the pocket 13 and the atmosphere and between said pocket and the interior of the inner cylinder.

A passage 16 in the lower end of the inner cylinder communicates with a passage 16′ in the bottom of the outer cylinder and arranged in one of these passages, the latter as shown in the present instance, is an inwardly opening check valve 17 of any suitable or preferred type.

Flexibly connected in any preferred manner with the top of the intermediate cylinder is a rod 18 which leads downwardly past the outer cylinder and is preferably threaded at its lower end or otherwise suitably formed for attachment to a bracket 19 whereby it may be secured to a part of the running gear of a vehicle.

As shown in Figures 1 and 2, my device is particularly adapted for connection between the frame 20 and the axle 21 of a vehicle of the type in which the frame is yieldably supported upon the axle by a spring 22, although it may be connected between the frame and any other part of the running gear or directly with the spring if desired.

In its properly assembled and applied position the outer cylinder is secured to the frame by bolts 23, the bracket 19 is secured to the axle 21 and the rod 18 connects the intermediate cylinder with said bracket; the pocket 13 is filled with oil or other fluid, and suitable apparatus is employed to compress air by way of the check valve 17 and passages 16 and 16' in the space between cylinders 11 and 12. Compression of air or other fluid between these cylinders tends to move said cylinders relatively outward and consequently moves the axle 21 toward the frame and thus places on the spring 22 a massless artificial load.

Sufficient pressure is introduced between the cylinders 10 and 11 to impose substantially a normal load on the spring 22 in order to obtain the easiest riding qualities of the vehicle, and this pressure, constantly acting to compress the spring, allows the frame to approach the axle freely under sudden jolts, but acts immediately to check any rebound of the spring following its excessive compression.

The oil in the pocket 13 serves not only to lubricate the cylinders, but to assist the rings 14 and 15 in preventing the escape of air from the space between the cylinders 11 and 12 with a consequent reduction of pressure.

From the foregoing description taken in connection with the accompanying drawings it is believed that the construction, operation and advantages of my invention will be clearly understood, and while I have herein disclosed one preferred embodiment of my invention, it will be understood that the same may be modified and supplied with desirable additions within its scope as defined in the appended claims.

I claim :—

1. The combination with a support and a load carrying member yieldably mounted thereon for movement toward and away from said support, of means interposed between the support and member and containing fluid under pressure acting to impose a massless artificial load on the member.

2. The combination with a support and a load carrying member yieldably mounted thereon for movement toward and away from said support, of means including plural telescoping cylinders interposed between the support and member and containing fluid under pressure acting to impose a massless artificial load on the member.

3. The combination with a vehicle running gear and a frame yieldably supported thereon, of a fluid operated device interposed between the gear and frame acting normally to impose a massless artificial load on the frame.

4. The combination with a vehicle running gear and a frame yieldably supported thereon, of a fluid operated device interposed between the gear and frame acting normally to impose a load on the frame, said device including a pair of telescoping cylinders connected respectively to the frame and gear and containing fluid under pressure.

5. The combination with a vehicle running gear and a frame yieldably supported thereon, of a fluid operated device interposed between the gear and frame acting normally to impose a massless artificial load on the frame, said device including a pair of cylinders connected respectively to the gear and frame, means for introducing pressure into the space between said cylinders and fluid means to prevent leakage of said pressure.

6. A device adapted to be interposed between the frame and running gear of a vehicle and to contain fluid under pressure to impose an artificial load on the frame, comprising an outer cylinder, an inner cylinder carried by and spaced from said outer cylinder, and an intermediate cylinder slidable between said inner and outer cylinders.

7. A device adapted to be interposed between the frame and running gear of a vehicle and to contain fluid under pressure to impose an artificial load on the frame, comprising an outer cylinder, an inner cylinder carried by and spaced from said outer cylinder, and an intermediate cylinder slidable between said inner and outer cylinders, said inner cylinder being shaped to provide a pocket between it and the outer and intermediate cylinders to contain a lubricant effective to prevent escape of pressure from said cylinder.

In testimony whereof I hereunto affix my signature.

CHARLES E. ARNESON.